(12) United States Patent
Zhi et al.

(10) Patent No.: US 11,839,004 B2
(45) Date of Patent: Dec. 5, 2023

(54) DRIVING CIRCUIT OF A LAMP AND METHOD FOR OPERATING THE DRIVING CIRCUIT OF THE LAMP

(71) Applicant: Current Lighting Solutions, LLC, East Cleveland, OH (US)

(72) Inventors: Yin Zhi, Shanghai (CN); Junhua Huang, Shanghai (CN); Zhichao Liu, Shanghai (CN); Junxian Chu, XiAn (CN); Dengfeng He, XiAn (CN)

(73) Assignee: SAVANT TECHNOLOGIES LLC, East Cleveland, OH (US)

(*) Notice: Subject to any disclaimer, the term of this patent is extended or adjusted under 35 U.S.C. 154(b) by 322 days.

(21) Appl. No.: 17/285,672

(22) PCT Filed: Oct. 16, 2019

(86) PCT No.: PCT/CN2019/111384
§ 371 (c)(1),
(2) Date: Sep. 28, 2021

(87) PCT Pub. No.: WO2020/078363
PCT Pub. Date: Apr. 23, 2020

(65) Prior Publication Data
US 2022/0361306 A1    Nov. 10, 2022

(30) Foreign Application Priority Data
Oct. 16, 2018 (CN) .......................... 201811202914.0

(51) Int. Cl.
*H05B 45/50* (2022.01)
*H05B 41/298* (2006.01)
*H05B 45/56* (2020.01)

(52) U.S. Cl.
CPC ................................. *H05B 45/56* (2020.01)

(58) Field of Classification Search
CPC ........ H05B 45/00; H05B 45/30; H05B 45/50; H05B 45/56; H05B 41/044; H05B 41/295;
(Continued)

(56) References Cited

U.S. PATENT DOCUMENTS 8,322,878 B2    12/2012 Hsia et al.
2011/0043127 A1*  2/2011 Yamasaki ............ H05B 45/385
                                                    315/291
(Continued)

FOREIGN PATENT DOCUMENTS

CN      107809104 A    3/2018
CN      108233332 A    6/2018
CN      207589235 U    7/2018

OTHER PUBLICATIONS

Chinese Office Action dated Jan. 6, 2021 which was issued in a counterpart Chinese application No. CN201811202914.0.
(Continued)

*Primary Examiner* — Thai Pham
(74) *Attorney, Agent, or Firm* — Buckley, Maschoff & Talwalkar LLC

(57) ABSTRACT

A driving circuit and a method for operating the driving circuit is provided for a lamp, the lamp includes a lighting unit, and a first and a second pair of connection pins for coupling the driving circuit to a power supply unit. The driving circuit includes a pre-heating detection circuit and a protection circuit. The pre-heating detection circuit is coupled to the first pair of connection pins and configured to detect a voltage between the first pair of connection pins and output a reference voltage. The protection circuit includes a switching circuit connected in series with the lighting unit, the protection circuit is configured to compare the reference voltage with an input voltage of the lamp and turn on the
(Continued)

switching circuit to light the lighting unit when the input voltage of the lamp is greater than the reference voltage.

12 Claims, 5 Drawing Sheets

(58) Field of Classification Search
CPC ..... H05B 41/298; H05B 41/2981; F21K 9/27; F21K 9/272; F21K 9/275
See application file for complete search history.

(56) References Cited

U.S. PATENT DOCUMENTS

| | | | |
|---|---|---|---|
| 2011/0228526 A1* | 9/2011 | Hartikka | F21K 9/27 362/221 |
| 2012/0299494 A1* | 11/2012 | Hartikka | H05B 45/325 315/297 |
| 2012/0313540 A1* | 12/2012 | Lin | F21K 9/27 315/201 |
| 2015/0061542 A1* | 3/2015 | Hsia | F21V 25/04 315/294 |
| 2017/0164434 A1* | 6/2017 | Xiong | F21V 23/06 |
| 2017/0359881 A1 | 12/2017 | Hsia | |
| 2019/0170336 A1* | 6/2019 | Sun | H05B 45/345 |

OTHER PUBLICATIONS

International Search Report and Written Opinion dated Jan. 15, 2020 which was issued in connection with counterpart PCT Application No. PCT/CN2019/111384.

* cited by examiner

DRIVING CIRCUIT OF A LAMP AND METHOD FOR OPERATING THE DRIVING CIRCUIT OF THE LAMP

BACKGROUND

Embodiments of the present disclosure relate generally to a lighting apparatus, and more particularly relate to a driving circuit of a lamp for preventing from being exposed to a risk of electric shock at an external connection pin of the lamp.

As a new generation light source, LED has advantages of energy saving, environmental protection, long life, diverse colors, stable beam concentration, and high electro-optical conversion rate. Therefore, in recent years, the use of LEDs as illumination sources has been a trend.

LED tube lamps with double-pin connectors at both ends, such as T8, T12, are powered by ballasts at both ends of the connector under steady state, and AC current flows between the connectors. Among them, the ballast includes an electronic ballast and an inductive ballast. The electronic ballast outputs a high frequency current, while the inductive ballast outputs a low frequency current. When the lamp is installed or replaced, especially the LED tube lamp powered by the magnetic ballast, if only the connection pins at one end is connected to a power supply device, the connection pins at the other end of the lamp is potentially dangerous, which may produce a risk of electric shock to installers.

Therefore, it is desirable to provide a driving circuit of a lamp to address one or more of the above-mentioned situations.

BRIEF DESCRIPTION

In accordance with one embodiment disclosed herein, a driving circuit is provided for a lamp, the lamp includes a lighting unit, and a first and a second pair of connection pins for coupling the driving circuit to a power supply unit. The driving circuit includes a pre-heating detection circuit and a protection circuit. The pre-heating detection circuit is coupled to the first pair of connection pins and configured to detect a voltage between the first pair of connection pins and output a reference voltage. The protection circuit includes a switching circuit connected in series with the lighting unit, the protection circuit is configured to compare the reference voltage with an input voltage of the lamp and turn on the switching circuit to light the lighting unit when the input voltage of the lamp is greater than the reference voltage.

In some embodiments, the protection circuit includes a control circuit coupled to the pre-heating detection circuit to receive the reference voltage, and the control circuit is configured to output a control signal to the switching circuit via a comparative result between the reference voltage and the input voltage of the lamp.

In some embodiments, when the input voltage of the lamp is greater than the reference voltage, the control circuit outputs a first control signal to the switching circuit to turn on the switching circuit, and when the input voltage of the lamp is less than the reference voltage, the control circuit outputs a second control signal to the switching circuit to turn off the switching circuit.

In some embodiments, the pre-heating detection circuit outputs a first reference voltage when the voltage between the first pair of connection pins is less than 2 volts, the pre-heating detection circuit outputs a second reference voltage when the voltage between the first pair of connection pins is greater than or equal to 2 volts, wherein the first reference voltage is greater than the second reference voltage.

In some embodiments, a voltage value of the first reference voltage is greater than or equal to 300 volts, and a voltage value of the second reference voltage is from 200 volts to 270 volts.

In some embodiments, the driving circuit further includes an additional pre-heating detection circuit coupled to the second pair of connection pins of the lamp and configured to detect a voltage between the second pair of connection pins and output the reference voltage together with the pre-heating detection circuit connected in series with the additional pre-heating detection circuit.

In some embodiments, the pre-heating detection circuit and the additional pre-heating detection circuit output a third reference voltage when at least one of the voltage between the first pair of connection pins and the voltage between the second pair of connection pins is less than 2 volts, the pre-heating detection circuit and the additional pre-heating detection circuit output a fourth reference voltage when both the voltage between the first pair of connection pins and the voltage between the second pair of connection pins are greater than or equal to 2 volts, wherein the third reference voltage is greater than the fourth reference voltage.

In some embodiments, a voltage value of the third reference voltage is greater than or equal to 300 volts, and a voltage value of the fourth reference voltage is less than 300 volts.

In some embodiments, the driving circuit further includes a first impedance circuit coupled to the first pair of connection pins and configured to receive an alternating voltage from the first pair of connection pins and provide a rectified input voltage.

In some embodiments, the input voltage of the lamp is selected from the alternating voltage and the rectified input voltage.

In some embodiments, the switching circuit comprises an initial starting current-limiting circuit configured to limit a current through the lighting unit in the time of circuit conducting.

In accordance with another embodiment disclosed herein, a method for operating a driving circuit is provided for a lamp, the lamp includes a lighting unit, and a first and a second pair of connection pins for coupling the driving circuit to a power supply unit. The method includes: detecting a voltage between the first pair of connection pins; outputting a reference voltage based on the voltage between the first pair of connection pins; comparing the reference voltage with an input voltage of a lamp; and controlling the lighting unit to be turned on or off based on the comparing.

BRIEF DESCRIPTION OF THE DRAWINGS

The accompanying drawings, which are incorporated herein and form part of the specification, illustrate the present disclosure and, together with the description, further serves to explain the principles of the disclosure and to enable a person skilled in the relevant art(s) to make and use the disclosure.

DETAILED DESCRIPTION

Unless defined otherwise, technical and scientific terms used herein have the same meaning as is commonly understood by one of ordinary skill in the art to which this disclosure belongs. The terms "first", "second", and the like, as used herein do not denote any order, quantity, or importance, but rather are used to distinguish one element from another. Also, the terms "a", and "an" do not denote a limitation of quantity, but rather denote the presence of at least one of the referenced items. The use of "including," "comprising" or "having" and variations thereof herein are meant to encompass the items listed thereafter and equivalents thereof as well as additional items. The terms "connected" and "coupled" are not restricted to physical or mechanical connections or couplings, and can include electrical connections or couplings, whether direct or indirect.

The present application is based on a driving circuit of a lamp for preventing an electric shock of an installer when the lamp is installed or replaced.

Lamps of the present application include, but are not limited to, light emitting diode (LED) lamps, organic light emitting diode (OLED) lamps, fluorescent lamps, and high intensity discharge (HID) lamps. The LED tube lamp will be taken as an example for detailed description.

Figure 1:
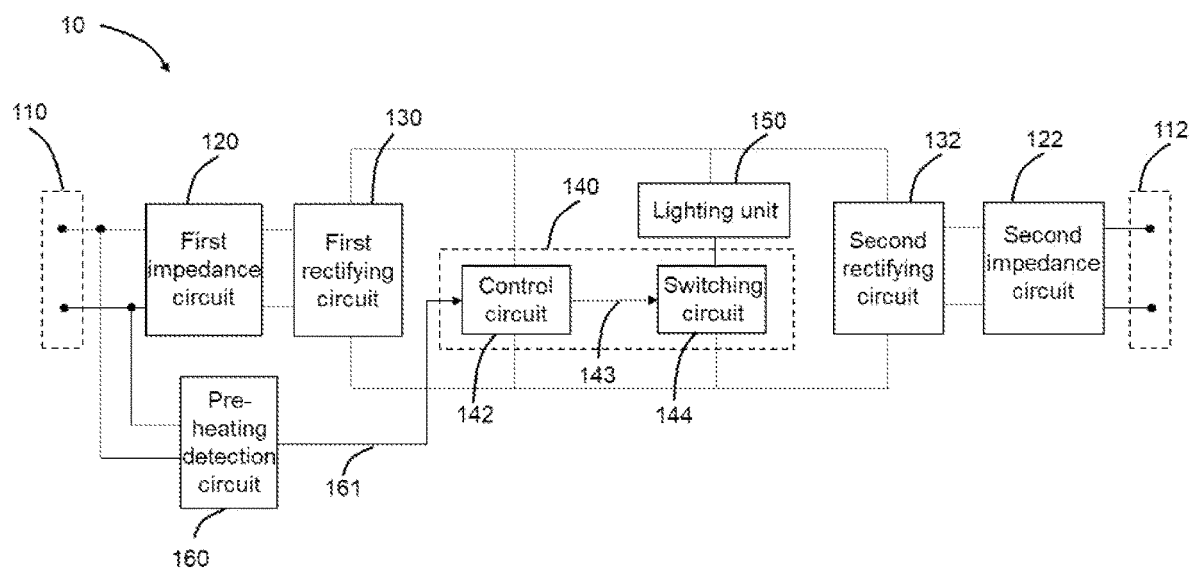
FIG. 1 is a functional block diagram of a lamp driving circuit, in accordance with aspects described herein.

FIG. 1 is a functional block diagram of a lamp driving circuit 10. The driving circuit 10 of a LED lamp includes a first pair of connection pins 110 and a second pair of connection pins 112 disposed oppositely for coupling the driving circuit 10 to a power supply device (not shown). In some embodiments, the power supply device can be an inductive ballast or an electronic ballast. The driving circuit 10 includes a first impedance circuit 120, a second impedance circuit 122, a first rectifying circuit 130, a second rectifying circuit 132, a protection circuit 140, an LED lighting unit 150, and a pre-heating detection circuit 160. The pre-heating detection circuit 160 is coupled to the first pair of connection pins 110 and configured to detect a voltage between the first pair of connection pins 110 and output a reference voltage to the protection circuit 140 according to the detected voltage.

In some embodiments, the driving circuit with leakage protection is more applied in tube lamps having an inductive ballast which can be rapid started as a power supply device. Because the operating frequency of the inductive ballast is low, the risk of electric shock is relatively greater.

As shown in FIG. 1, the protection circuit 140 includes a control circuit 142 and a switching circuit 144 connected in series with the lighting unit 150. The protection circuit 140 receives a reference voltage 161 output from the pre-heating detection circuit 160 and compares the reference voltage 161 with an input voltage of the lamp. When the input voltage of the lamp is greater than the reference voltage 161, the switching circuit is turned on to light the lighting unit 150. In some embodiments, the control circuit 142 is coupled to the pre-heating detection circuit 160 to receive the reference voltage 161, and outputs a control signal 143 to the switching circuit 144 via a comparison result between the reference voltage 161 and the input voltage of the lamp to control the "on" and "off" of the switching circuit. In some embodiments, the input voltage of the lamp may be an AC voltage input by the power supply device or may be an input voltage rectified by the first rectifying circuit 130, that is, the voltage across a capacitor C4 in FIG. 2.

Figure 2:
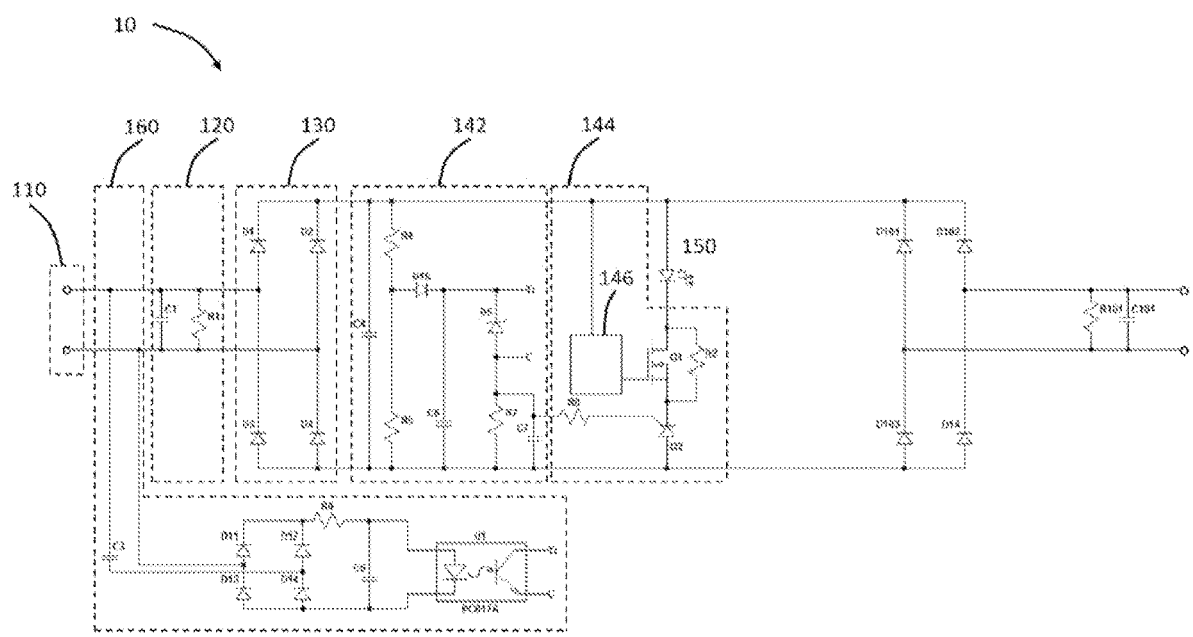
FIG. 2 is a circuit diagram of the lamp driving circuit shown in FIG. 1, in accordance with aspects described herein.

FIG. 2 is a circuit diagram of the lamp driving circuit 10 shown in FIG. 1. In some embodiments, as shown in FIG. 1 and FIG. 2, the two ends of the first impedance circuit 120 are respectively coupled to the first pair of connection pins 110 for simulating a filament impedance characteristic of a fluorescent lamp. The first impedance circuit 120 is connected in parallel with the pre-heating detection circuit 160, the first impedance circuit 120 includes a capacitor C1 and a resistor R1 connected in parallel. The first rectifying circuit 130 is coupled to both ends of the first impedance circuit 120 for rectifying an alternating current output by the first impedance circuit 120 to obtain a direct current to the lighting unit 150. The first rectifying circuit 130 includes a rectifier bridge composed of diodes D1, D2, D3, and D4. The second impedance circuit 122 and the second rectifying circuit 132 are similar in structure and function to the first impedance circuit 120 and the first rectifying circuit 130, and the description thereof will not be repeated herein. The second impedance circuit 122 includes a capacitor C101 and a resistor R101 connected in parallel, and the second rectifying circuit 132 includes a rectifier bridge composed of diodes D101, D102, D103, and D104.

In some embodiments, as shown in FIG. 2, the pre-heating detection circuit 160 includes a capacitor C3, bridged diodes D11, D12, D13 and D14, a resistor R6, a capacitor C5, and an optocoupler U1. In some embodiments, the optocoupler U1 may be a PC817A. One end of the optocoupler U1 is coupled to the two ends of the capacitor C5, when a detected pre-heating voltage between the first pair of connecting pins 110 is greater than or equal to a preset value, the first pair of connecting pins 110 can be considered to be inserted into the power supply device, that is, in electrical communication with the power supply device. At this time, two terminals Tr and c of the other end of the optocoupler U1 output a second reference voltage to corresponding terminals of the control circuit 142. When the detected pre-heating voltage between the first pair of connecting pins 110 is less than the preset value, it can be considered that the first pair of connecting pins 110 are not inserted into the power supply device, that is, disconnected from the power supply device. At this time, the two terminals Tr and c of the other end of the optocoupler U1 output a first reference voltage to the corresponding terminals of the control circuit 142. Among them, the preset value ranges from 2 to 3 volts. In some embodiments, the pre-heating detection circuit outputs the first reference voltage when the voltage between the first pair of connection pins 110 is less than 2 volts. When the voltage between the first pair of connection pins 110 is greater than or equal to 2 volts, the pre-heating detection circuit outputs the second reference voltage, wherein the first reference voltage is greater than the second reference voltage. In some specific embodiments, the first reference voltage has a voltage value greater than or equal to 300 volts and the second reference voltage has a voltage value from 200 volts to 270 volts. In another embodiment, the detected voltage between the first pair of connection pins 110 is less than the preset value, and it is also possible that the first rectifying circuit 130 uses an instant start type ballast circuit.

In some embodiments, the control circuit 142 can be considered as a comparator circuit including capacitors C4, C6, and C7, resistors R4, R5, and R7, a diode D15, and a Zener diode D5. The control circuit 142 receives and compares the input voltage of the lamp at both ends of C4 with the reference voltage between the terminals Tr and c. When the input voltage of the lamp is greater than the reference voltage, the control circuit 142 outputs a first control signal to the switch Q2 of the switching circuit 144 to turn on the switching circuit 144, thereby turning on the illumination unit 150. When the input voltage of the lamp is less than the reference voltage, the control circuit 142 outputs a second control signal to a switch Q2 of the switching circuit 144 to turn off the switching circuit 144, thereby turning off the power supply to the lighting unit 150.

In some embodiments, the switching circuit 144 further includes at least one switching device Q1, such as metal oxide semiconductor field effect transistors (MOSFETs) and/or bipolar junction transistors (BJTs). The input voltage of the lamp is adjusted and delivered to the lighting unit 150 by turning on and off of the switching device Q1.

In some embodiments, the switching circuit 144 further includes a initial starting current-limiting circuit 146. One end of the initial starting current-limiting circuit 146 is coupled to a gate of the switching device Q1 for limiting a current through the lighting unit 150 in the time of circuit conducting to protect the lighting unit 150.

Figure 5:
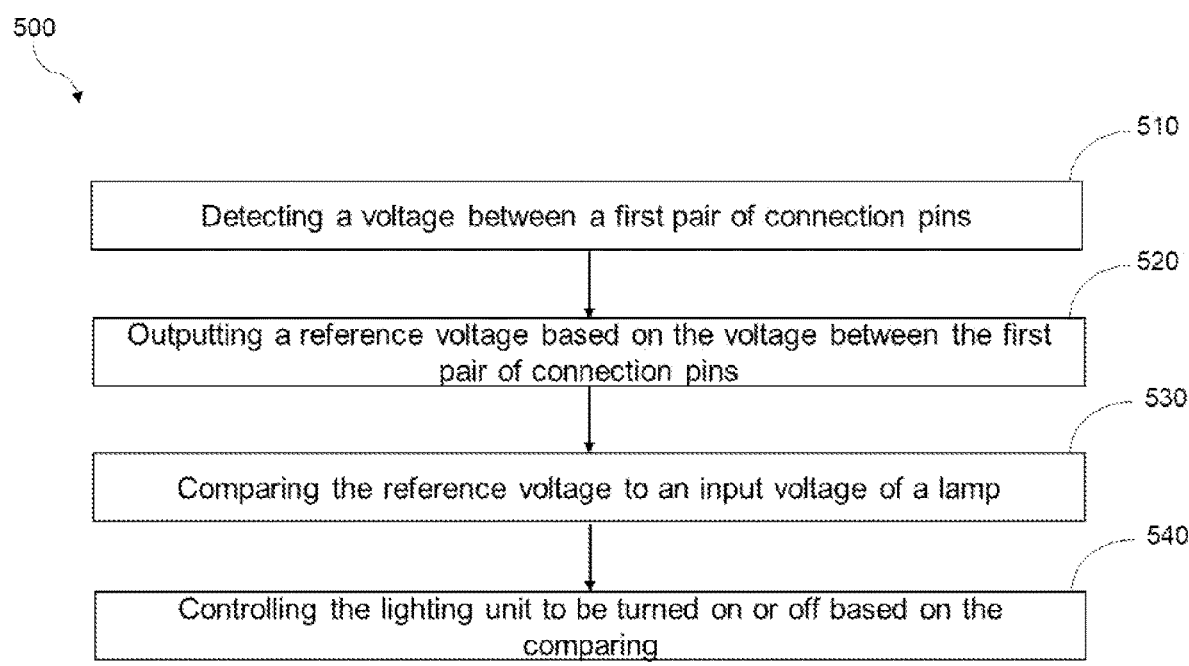
FIG. 5 is a flow chart of a method for operating a driving circuit of a lamp, in accordance with aspects described herein.

Referring to FIG. 1 and FIG. 5, it is specifically explained how the driving circuit 10 functions to prevent electric shock of the installer when the tube lamp is installed or replaced.

What may happen in lighting fixtures is that the LED tube lamp light needs to be installed in the lighting fixture during the replacement of the conventional fluorescent tube lamp with the LED tube lamp. The general order is to install both ends of the lamp at the same time, but there is a certain probability that one end has been installed and the installer may be electric shocked if it accidentally touches the connecting pin of the uninstalled end. In some embodiments, a replacement lamp of T12 is taken as an example, the end of the second pair of connection pins 112 is installed in the lighting fixture, and FIG. 5 shows a flowchart of a method for operating the driving circuit 10 of the lamp. Firstly, as in step 510, detecting a voltage between the first pair of connection pins 110. Secondly, as in step 520, outputting a reference voltage based on the voltage between the first pair of connection pins 110. Because the first pair of connection pins 110 are not mounted in the power supply device, the voltage between the first pair of connection pins 110 detected by the pre-heating detection circuit 160 is less than a preset value (e.g., less than 2 volts). The pre-heating detection circuit 160 outputs a first reference voltage having a voltage value greater than or equal to 300 volts. Again, as in step 530, comparing the reference voltage with an input voltage of a lamp. The control circuit 142 receives the first reference voltage output by the pre-heating detection circuit 160 and compares it with the input voltage of the lamp. In some embodiments, for example, the input voltage of the replacement lamp of T12, that is, the voltage to ground at one end of the power supply device, ranges from about 200 to 270 volts. Finally, as in step 540, controlling the lighting unit to be turned on or off based on the comparing. In this embodiment, the input voltage is less than the first reference voltage, and the control circuit 142 outputs the second control signal to the switch Q2 of the switching circuit 144 to turn off the switching circuit 144, thereby turning off the power supply to the lighting unit 150 while disconnecting circuit connection to avoid electric shock. When the first pair of connection pins 110 and the second pair of connection pins 112 are both mounted in the power supply device, the voltage between the first pair of connection pins 110 is greater than the preset value (e.g., greater than 2 volts). The pre-heating detection circuit 160 outputs a second reference voltage having a voltage value from about 271 to 290 volts. The input voltage of the tube lamp at this time, that is, the voltage of the power supply device, is greater than 300 volts, which means the input voltage is greater than the second reference voltage. The control circuit 142 outputs the first control signal to the switch Q2 of the switching circuit 144 to turn on the switching circuit 144, and then the lighting unit 150 is turned on to emit light.

In some embodiments, taking the replacement lamp of the T12 as an example, one end of the first pair of connection pins 110 is installed in the lighting fixture. Because the first pair of connection pins 110 have been installed in the power supply device, the voltage between the first pair of connection pins 110 detected by the pre-heating detection circuit 160 is greater than the preset value. At this time, the pre-heating detection circuit 160 outputs the second reference voltage, and the voltage of the second reference voltage is from 271 to 290 volts. The control circuit 142 receives the second reference voltage output by the pre-heating detection circuit 160 and compares it with the input voltage of the lamp. In some embodiments, for example, the input voltage of the replacement lamp of T12, that is, the voltage to ground at one end of the power supply device, ranges from about 200 to 270 volts, which means the input voltage is less than the second reference voltage. The control circuit 142 outputs the second control signal to the switch Q2 of the switching circuit 144 to turn off the switching circuit 144, thereby turning off the power supply to the lighting unit 150 while disconnecting the circuit. Therefore, even if the pre-heating detection circuit 160 detected the pre-heating voltage between the first pair of connection pins 110, since the second reference voltage is greater than the voltage to ground at one end of the power supply device, there is no risk of electric shock.

In some other embodiments, in addition to the above installation process, it is also possible to remove the LED tube lamp for replacement. The general order is to remove both ends of the tube at the same time, but there is a certain probability that one end has been removed first, and the installer may be electric shocked if it accidentally touches the connecting pin of the removed end. In this embodiment, the method and control mechanism for operating the driving circuit 10 are unchanged, and the description will not be repeated herein.

In the above embodiments, to reduce cost and reduce circuit complexity, the driving circuit 10 includes the pre-heating detection circuit 160 coupled to the first pair of connecting pins 110. In some other embodiments, the pre-heating detection circuit 160 can also be coupled to the second pair of connection pins 112. The method and control mechanism for operating the driving circuit 10 are unchanged.

Figure 3:
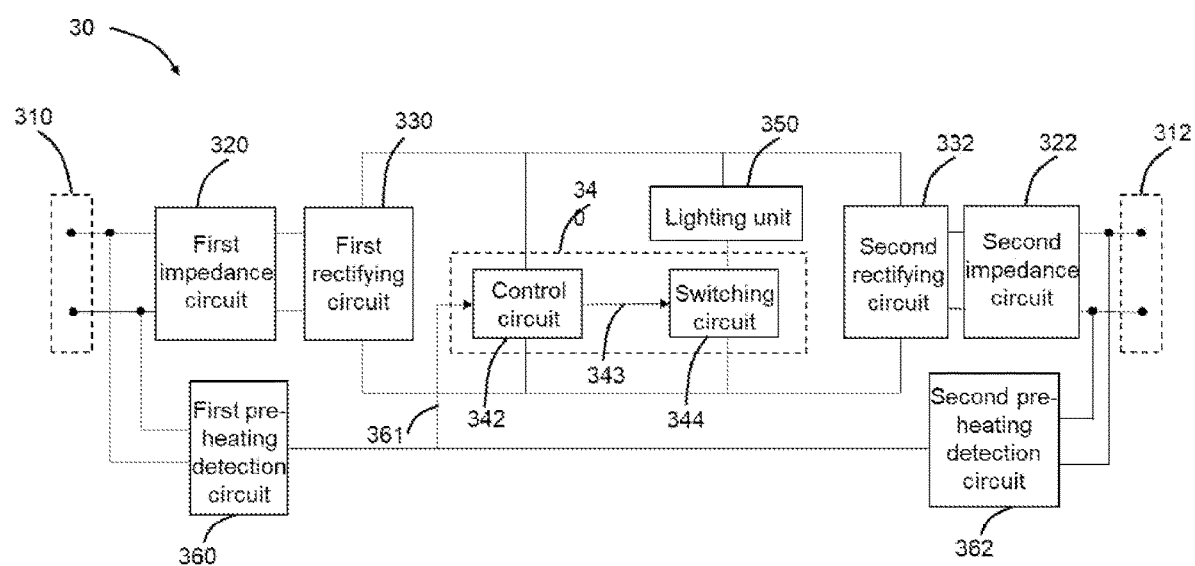
FIG. 3 is a functional block diagram of another lamp driving circuit, in accordance with aspects described herein.
Figure 4:
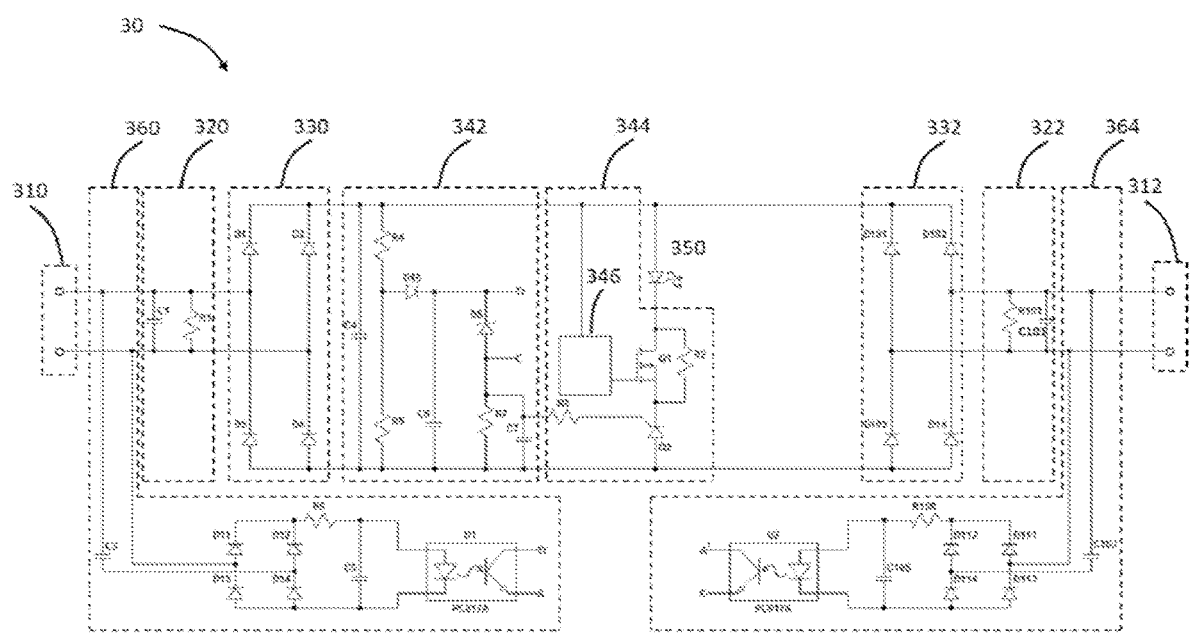
FIG. 4 is a circuit diagram of the lamp driving circuit shown in FIG. 3, in accordance with aspects described herein.

In some specific embodiments, in order to avoid the risk of electric shock during installation or replacement of the tube lamp, at least two pre-heating detection circuits may be used in the driving circuit to respectively detect the voltage between the two pairs of connection pins. FIG. 3 is a functional block diagram of the lamp driving circuit 30. FIG. 4 is a circuit diagram of the lamp driving circuit 30 shown in FIG. 3.

Referring to FIG. 3 and FIG. 4, the driving circuit 30 of the LED lamp includes a first pair of connecting pins 310 and a second pair of connecting pins 312 disposed oppositely for coupling the driving circuit 30 to the power supply device (not shown). The driving circuit 30 further includes a first impedance circuit 320, a second impedance circuit 322, a first rectifying circuit 330, a second rectifying circuit 332, a protection circuit 340, an LED lighting unit 350, a first pre-heating detection circuit 360, and a second pre-heating detection circuit 362. The arrangements, functions and deformations of the circuit components of the first impedance circuit 320, the second impedance circuit 322, the first rectifying circuit 330, the second rectifying circuit 332, the protection circuit 340, and the first pre-heating detection circuit 360 are similar with the first impedance circuit 120, the second impedance circuit 122, the first rectifying circuit 130, the second rectifying circuit 132, the protection circuit 140, and the pre-heating detection circuit 160 in the driving circuit 10 shown in FIG. 1, and the description will not be repeatedly herein.

In some embodiments, the first pre-heating detection circuit 360 is coupled to the first pair of connection pins 310 for detecting a voltage between the first pair of connection pins 310, that is, a first pre-heating voltage. The second pre-heating detection circuit 362, which may also be referred to as an additional pre-heating detection circuit, is coupled to the second pair of connection pins 312 for detecting a voltage between the second pair of connection pins 312, that is, a second pre-heating voltage.

In some embodiments, the first pre-heating detection circuit 360 and the second pre-heating detection circuit 362 are connected in series to cooperate to output a reference voltage to the protection circuit 340. The protection circuit 340 includes a control circuit 342 and a switching circuit 344 in series with the lighting unit 350. The protection circuit 340 receives the reference voltage 361 output by the first pre-heating detection circuit 360 and the second pre-heating detection circuit 362 and compares the reference voltage 361 with an input voltage of the lamp. When the input voltage of the lamp is greater than the reference voltage 361. The switching circuit is turned on to light the lighting unit 350. In some embodiments, the control circuit 342 outputs a control signal 343 to the switching circuit 344 based on the comparison of reference voltage 361 and the input voltage of the lamp to control the "on" and "off" of the switching circuit.

In some embodiments, as shown in FIG. 4, the first pre-heating detection circuit 360 includes a capacitor C3, bridged diodes D11, D12, D13 and D14, a resistor R6, a capacitor C5, and an optocoupler U1. The second pre-heating detection circuit 362 includes a capacitor C103, bridged diodes D111, D112, D113 and D114, a resistor R106, a capacitor C105, and an optocoupler U2. In some embodiments, the optocoupler U1 and U2 may use PC817A. One end of the optocoupler U1 is coupled to both ends of the capacitor C5, and the other end has two terminals: a terminal Tr and a terminal A, and the terminal Tr is coupled to the control circuit 342. One end of the optocoupler U2 is coupled to the two ends of the capacitor C105, and the other end has two terminals: a terminal Tr and a terminal A', the terminal C is coupled to the control circuit 342, and the terminal A' is coupled to the terminal A of the optocoupler U1.

In some embodiments, when at least one of the pre-heating voltages detected by the first pair of connecting pins 310 and the second pair of connecting pins 312 is less than a preset value, it can be considered that at least one end of the driving circuit 30 is not inserted into the power supply device, the first pair of connection pins 310 and the second pair of connection pins 312 cooperate to output a third reference voltage to the control circuit 342. When the pre-heating voltages detected by the first pair of connecting pins 310 and the second pair of connecting pins 312 are both greater than the preset value, it can be considered that both ends of the driving circuit 30 are connected to the power supply device, the first pair of connection pins 310 and the second pair of connection pins 312 cooperate to output a fourth reference voltage to the control circuit 342. Among them, the preset value ranges from 2 to 3 volts. The pre-heating detection circuit outputs the third reference voltage when at least one of the voltages detected by the first pair of connection pins and the second pair of connection pins is less than 2 volts. When the voltages detected by the first pair of connection pins and the second pair of connection pins are both greater than or equal to 2 volts, the pre-heating detection circuit outputs the fourth reference voltage, wherein the third reference voltage is greater than the fourth reference voltage. In some specific embodiments, the third reference voltage has a voltage value greater than or equal to 300 volts and the fourth reference voltage has a voltage value less than 300 volts.

The following describes in detail how the driving circuit 10 achieves the function of avoiding electric shock to the installer when the tube lamp is installed or replaced with reference to FIG. 3.

In some embodiments, for example, one end of the first pair of connection pins 310 is installed in the lighting fixture. Firstly, the first pre-heating detection circuit 360 and the second pre-heating detection circuit 362 respectively detect the first pre-heating voltage between the first pair of connecting pins 310 and the second pre-heating voltage between the second pair of connecting pins 312 at the same time. Then, the reference voltage is outputted based on the first pre-heating voltage and the second pre-heating voltage. In this embodiment, the second pair of connection pins 312 are not installed in the power supply device, so the second pre-heating voltage is less than the preset value (e.g., less than 2 volts), that is, at least one of the pre-heating voltages between the first pair of connection pins 310 and the second pair of connection pins 312 is less than the preset value. At this time, the first pre-heating detection circuit 360 and the second pre-heating detection circuit 362 cooperate to output a third reference voltage, and the voltage value of the third reference voltage is greater than or equal to 300 volts. What's more, comparing the third reference voltage and the input voltage of the lamp. In some embodiments, the input voltage of the tube lamp at this time, that is, the voltage to the ground at one end of the power supply device, is from about 200 to about 290 volts, which means the input voltage is less than the third reference voltage. At this time, the control circuit 342 outputs the second control signal to a switch Q2 of the switching circuit 344 to turn off the switching circuit 344, thereby turning off the power supply to the lighting unit 350 and disconnecting the circuit to prevent electric shock. When the first pair of connection pins 310 and the second pair of connection pins 312 are both mounted in the power supply device, the voltages between the first pair of connection pins 310 and the second pair of connection pins 312 are both greater than the preset value (e.g., greater than 2 volts), the first pre-heating detection circuit 360 and the second pre-heating detection circuit 362 cooperate to output a fourth reference voltage having a voltage value from about 200 to about 250 volts. Currently the input voltage of the tube lamp is the voltage of the power supply device, is greater than 250 volts, that is, the input voltage is greater than the fourth reference voltage. At this time, the control circuit 342 outputs the first control signal to the switch Q2 of the switching circuit 344 to turn on the switching circuit 344, and then the lighting unit 350 is turned on to emit light.

Those skilled in the art realize that the application is not limited to the embodiments described above. Although the embodiment as shown includes certain circuit elements, other types of circuit elements may be used. Some circuits, such as the control circuit, the pre-heating detection circuit, the initial starting current-limiting circuit, may also be replaced by other circuits or corresponding part of integrated circuits with similar functions. In some other embodiments, the driving circuit of the present application may also be integrated on one or more integrated circuits (ICs).

As can be seen from the above embodiments, the pre-heating detection circuit in the driving circuit detects the voltage between the pins of at least one end of the lamp and controls the "on" and "off" of the lighting unit and the driving circuit through the protection circuit. When the lamp is installed or replaced, it can prevent the installer from electric shock.

While embodiments of the disclosure have been described herein, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims.

Furthermore, the skilled artisan will recognize the interchangeability of various features from different embodiments. The various features described, as well as other known equivalents for each feature, can be mixed and matched by one of ordinary skill in this art to construct additional systems and techniques in accordance with principles of this disclosure.

The invention claimed is:

1. A driving circuit of a lamp for preventing an electric shock during installation or removal, the lamp comprising a lighting unit, and a first and a second pair of connection pins for coupling the driving circuit to a power supply unit, the driving circuit comprising:
   a pre-heating detection circuit coupled to the first pair of connection pins, the pre-heating detection circuit comprising an optocoupler and configured to detect a pre-heating voltage between the first pair of connection pins and to output a reference voltage via the optocoupler; and
   a protection circuit comprising a switching circuit connected in series with the lighting unit and operably connected to the optocoupler, the protection circuit configured to compare the reference voltage output from the optocoupler with an input voltage of the lamp and turn off the switching circuit thereby turning off the power supply to the lighting unit when the input voltage of the lamp is less than the reference voltage.

2. The driving circuit according to claim 1, wherein the protection circuit further comprises a control circuit operably coupled to the pre-heating detection circuit to receive the reference voltage from the optocoupler, wherein the control circuit is configured to output a control signal to the switching circuit via a comparative result between the reference voltage and the input voltage of the lamp.

3. The driving circuit according to claim 2, wherein when the input voltage of the lamp is greater than the reference voltage, the control circuit outputs a first control signal to the switching circuit to turn on the switching circuit.

4. The driving circuit according to claim 1, wherein the optocoupler of the pre-heating detection circuit outputs a first reference voltage when the voltage between the first pair of connection pins is less than 2 volts, and wherein the optocoupler of the pre-heating detection circuit outputs a second reference voltage when the voltage between the first pair of connection pins is greater than or equal to 2 volts, wherein the first reference voltage is greater than the second reference voltage.

5. The driving circuit according to claim 4, wherein a voltage value of the first reference voltage is greater than or equal to 300 volts, and a voltage value of the second reference voltage is from 200 volts to 270 volts.

6. The driving circuit according to claim 1, further comprising an additional pre-heating detection circuit coupled to the second pair of connection pins of the lamp, the additional pre-heating detection circuit comprising a second optocoupler and configured to detect a pre-heating voltage between the second pair of connection pins and output the pre-heating reference voltage via the second optocoupler together with the pre-heating detection circuit, and wherein the pre-heating detection circuit is connected in series with the additional pre-heating detection circuit.

7. The driving circuit according to claim 6, wherein the pre-heating detection circuit and the additional pre-heating detection circuit output a third reference voltage when at least one of the voltage between the first pair of connection pins and the voltage between the second pair of connection pins is less than 2 volts, the pre-heating detection circuit and the additional pre-heating detection circuit output a fourth reference voltage when both the voltage between the first pair of connection pins and the voltage between the second pair of connection pins are greater than or equal to 2 volts, wherein the third reference voltage is greater than the fourth reference voltage.

8. The driving circuit according to claim 7, wherein a voltage value of the third reference voltage is greater than or equal to 300 volts, and a voltage value of the fourth reference voltage is less than 300 volts.

9. The driving circuit according to claim 1, further comprising a first impedance circuit coupled to the first pair of connection pins and configured to receive an alternating voltage from the first pair of connection pins and provide a rectified input voltage.

10. The driving circuit according to claim 9, wherein the input voltage of the lamp is selected from the alternating voltage and the rectified input voltage.

11. The driving circuit according to claim 1, wherein the switching circuit comprises an initial starting current-limiting circuit configured to limit a current through the lighting unit.

12. A method for operating a driving circuit of a lamp to prevent an electric shock during installation or removal of the lamp, the lamp comprising a lighting unit, and a first pair of connection pins and a second pair of connection pins for coupling the driving circuit to a power supply unit, the method comprising:
   detecting, by a pre-heating detection circuit of the driving circuit, a voltage between the first pair of connection pins;
   outputting, by an optocoupler of the pre-heating detection circuit of the driving circuit, a reference voltage based on the voltage between the first pair of connection pins;

comparing, by a protection circuit of the driving circuit, the reference voltage received from the optocoupler with an input voltage of the lamp; and controlling, by the protection circuit, the lighting unit to be turned on when the reference voltage is greater than the input voltage or to be turned off when the reference voltage is less than the input voltage.

\* \* \* \* \*